United States Patent
Kim et al.

(10) Patent No.: US 10,067,615 B2
(45) Date of Patent: Sep. 4, 2018

(54) ELECTROSTATIC CAPACITIVE TOUCH-SENSITIVE PANEL IMPROVING TOUCH ACCURACY OF EDGE REGIONS

(71) Applicant: LG DISPLAY CO., LTD., Seoul (KR)

(72) Inventors: Dongsup Kim, Incheon (KR); Jaegyun Lee, Goyang-si (KR)

(73) Assignee: LG Display Co., Ltd., Seoul (KR)

( * ) Notice: Subject to any disclaimer, the term of this patent is extended or adjusted under 35 U.S.C. 154(b) by 252 days.

(21) Appl. No.: 14/471,515

(22) Filed: Aug. 28, 2014

(65) Prior Publication Data
US 2015/0060256 A1    Mar. 5, 2015

(30) Foreign Application Priority Data
Aug. 29, 2013 (KR) .......................... 10-2013-0103483

(51) Int. Cl.
*G06F 3/044* (2006.01)

(52) U.S. Cl.
CPC .... *G06F 3/044* (2013.01); *G06F 2203/04111* (2013.01)

(58) Field of Classification Search
CPC ................ G06F 3/044; G06F 2203/04111
USPC ........................................................... 345/173
See application file for complete search history.

(56) References Cited

U.S. PATENT DOCUMENTS

| | | | | |
|---|---|---|---|---|
| 2009/0244021 A1* | 10/2009 | Matsuo | ................... | G06F 3/044 345/173 |
| 2010/0182275 A1* | 7/2010 | Saitou | ..................... | G06F 3/044 345/174 |
| 2011/0227858 A1* | 9/2011 | An | .......................... | G06F 3/044 345/174 |
| 2012/0044165 A1* | 2/2012 | Kwak | .................... | G06F 3/044 345/173 |

(Continued)

FOREIGN PATENT DOCUMENTS

| | | |
|---|---|---|
| CN | 101546243 A | 9/2009 |
| CN | 201765581 U | 3/2011 |
| CN | 102375596 A | 3/2012 |

(Continued)

OTHER PUBLICATIONS

Office Action dated Dec. 1, 2016 for Chinese Application No. 201410394847.2, 13 pages.

*Primary Examiner* — Lisa Landis
(74) *Attorney, Agent, or Firm* — Seed Intellectual Property Law Group LLP (57) ABSTRACT

An electrostatic capacitive touch-sensitive panel has an active area; a touch electrode forming area; a routing wire forming area disposed; a plurality of first touch electrode lines disposed in the active area, with both ends extending to a plurality of electrode pattern extension regions; a plurality of second touch electrode lines disposed in the active area to cross the first direction so as to cross the first touch electrode lines without contact; a plurality of first routing wires connected to the plurality of first touch elec- (Continued)

trode lines, respectively; and a plurality of second routing wires connected to the plurality of second touch electrode lines, respectively. Each of the second touch electrode lines includes a plurality of second touch electrode patterns and a plurality of second connecting portions connecting neighboring second touch electrode patterns. The second touch electrode pattern has an asymmetrical portion.

12 Claims, 9 Drawing Sheets

(56) References Cited

U.S. PATENT DOCUMENTS

| 2013/0015865 A1 | 1/2013 | Izumi |
| 2014/0001966 A1* | 1/2014 | Cho ..................... H05B 37/00 315/161 |

FOREIGN PATENT DOCUMENTS

| CN | 102681735 A | 9/2012 |
| JP | 2011-039662 A | 2/2011 |

* cited by examiner

RELATED ART

FIG. 3

RELATED ART

FIG. 4

RELATED ART

|  | RS1 | RS2 | RS3 | RS4 | RS5 | RS6 |
|---|---|---|---|---|---|---|
| TS1 | n11 | n12 | n13 | n14 | n15 | n16 |
| TS2 | n21 | n22 | n23 | n24 | n25 | n26 |
| TS3 | n31 | n32 | n33 | n34 | n35 | n36 |
| TS4 | n41 | n42 | n43 | n44 | n45 | n46 |
| TS5 | n51 | n52 | n53 | n54 | n55 | n56 |
| TS6 | n61 | n62 | n63 | n64 | n65 | n66 |

ELECTROSTATIC CAPACITIVE TOUCH-SENSITIVE PANEL IMPROVING TOUCH ACCURACY OF EDGE REGIONS

This application claims the benefit of priority under 35 U.S.C. § 119(a) to Korean Patent Application No. 10-2013-0103483 filed on Aug. 29, 2013, which is incorporated by reference herein in its entirety.

BACKGROUND

Field

This document relates to a touch-sensitive panel, and more particularly to an electrostatic capacitive touch sensitive panel, which offers increased touch performance by improving the touch accuracy on the edge regions of a touch-sensitive panel with a narrow bezel.

Related Art

Recently, various input devices such as a keyboard, a mouse, a trackball, a joystick, and a digitizer have been used to configure an interface between users and home appliances or various kinds of information communication equipments. However, such input devices as a keyboard, a mouse, etc require the user to learn to use them and take up space. Therefore, the demand for input devices that are convenient and easy to use and reduce erroneous operations is ever increasing. In response to this demand, the use of a touch screen panel for enabling a user to input information by directly touching the screen with their hand or a pen has been suggested.

Touch-sensitive panels are classified into a resistive type, an electrostatic capacitive type, an electromagnetic type, etc. based on a method for sensing a touched portion. The resistive touch-sensitive panel determines a touched position by a voltage gradient based on changes of resistance in a state that a DC voltage is applied to metal electrodes formed on an upper plate or a lower plate. The electrostatic capacitive touch-sensitive panel senses a touched position based on changes in voltage generated in an upper plate or a lower plate when the user touches an equipotential conductive film formed on the upper or lower plate. The electromagnetic touch-sensitive panel senses a touched portion by reading an LC value induced when an electronic pen touches a conductive film. In addition, an optical touch-sensitive panel, an ultrasonic touch-sensitive panel, etc. are known.

Of these touch-sensitive panels, the electrostatic capacitive touch-sensitive panel is classified into a self-capacitance touch-sensitive panel and a mutual capacitance touch-sensitive panel. In the self-capacitance touch-sensitive panel, a plurality of independent patterns are formed in a touch area, and changes in electrostatic capacitance in the independent patterns are measured to determine the presence or absence of a touch. In the mutual-capacitance touch-sensitive panel, x-axis electrode lines or serials (e.g., touch driving electrode lines or serials) and y-axis electrode lines or serials (e.g., sensing electrode lines or serials) intersect each other to form a matrix in a touch electrode forming area of the touch-sensitive panel, a driving pulse is applied to the X-axis electrode lines, and changes in voltage appearing at sensing nodes defined by the crossing points between the X-axis electrode lines and the Y-axis electrode lines are sensed through the Y-axis electrode lines to determine the presence or absence of a touch.

Figure 1:
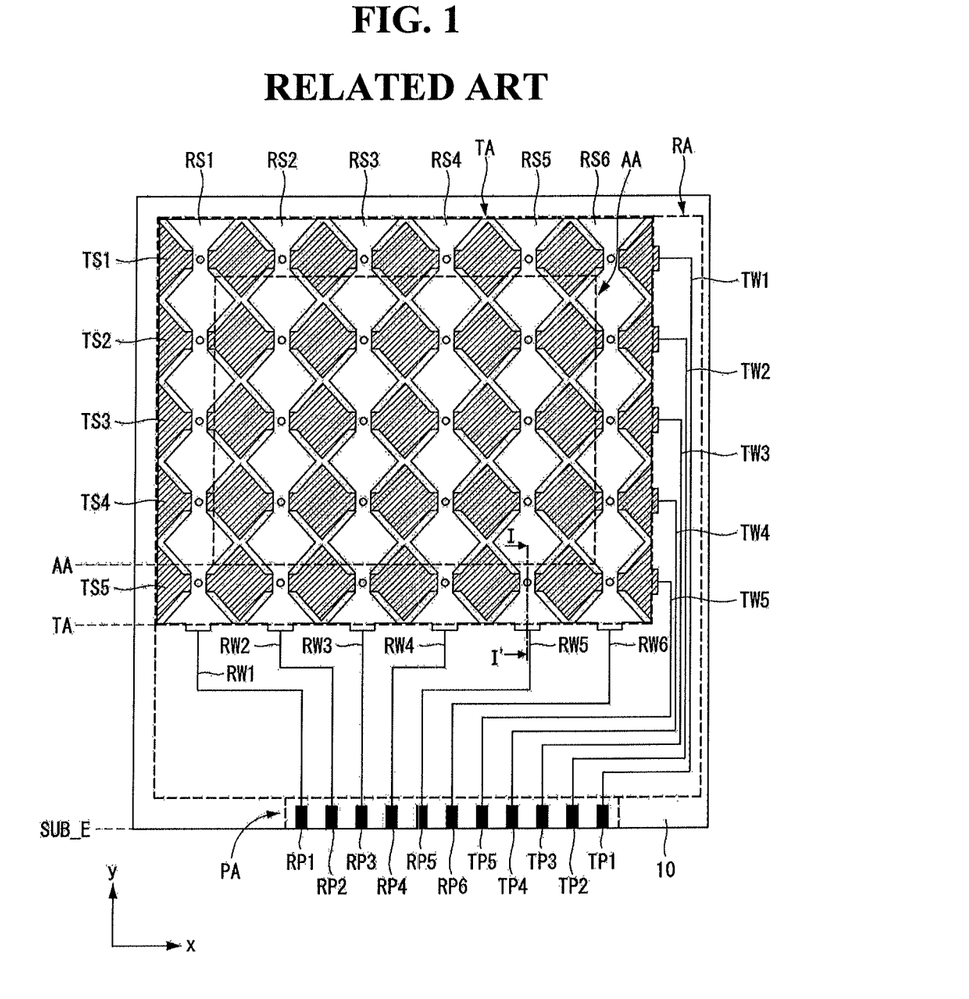
FIG. 1 is a plan view of a related art electrostatic capacitive touch-sensitive panel.
Figure 2:
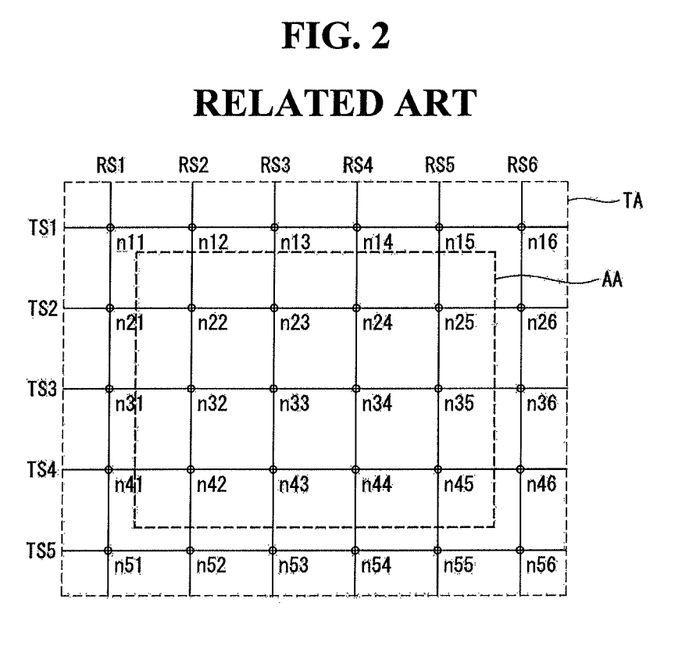
FIG. 2 is a view conceptually showing sensing nodes formed on the touch-sensitive panel of FIG. 1.

Hereinafter, a related art electrostatic capacitive touch-sensitive panel will be described with reference to FIGS. 1 and 2. FIG. 1 is a plan view of a related art electrostatic capacitive touch-sensitive panel. FIG. 2 is a view conceptually showing sensing nodes formed on the touch-sensitive panel of FIG. 1.

Referring to FIGS. 1 and 2, the electrostatic capacitive touch-sensitive panel comprises a touch electrode forming area TA where touch electrodes are formed, an active area AA corresponding to a data display area of a display device, a routing wire forming area RA where routing wires are formed to send and receive signals to and from the touch electrode forming area AA, and a pad forming area PA where routing pads are formed to connect the routing wires to signal lines of a touch driving circuit.

The touch electrode forming area TA comprises a plurality of first touch electrode lines TS1 to TS5 arranged on a transparent substrate 10 in parallel in a first direction (e.g. x-axis direction), and a plurality of second touch electrode lines RS1 to RS6 arranged in parallel in a second direction (e.g. y-axis direction) so as to cross over the first touch electrode lines TS1 to TS5 with an insulation layer (not shown) interposed between them. Points formed by the intersections of the first and second touch electrode lines TS1 to TS5 and RS1 to RS6 are referred to as sensing nodes n11 to n56. Due to the insulation layer (not shown), the first touch electrode lines TS1 to TS5 and the second touch electrode lines RS1 to RS6 are not in contact with each other at the sensing nodes n11 to n56. As such, when a touch driving voltage is applied to either the first touch electrode lines TS1 to TS5 or the second touch electrode lines RS1 to RS6, mutual capacitance occurs between both of the first touch electrode lines TS1 to TS5 and the second touch electrode lines RS1 to RS6.

The active area lies within the area defined by a line connecting the uppermost sensing nodes n11 to n16, a line connecting the lowermost sensing nodes n51 to n56, a line connecting the leftmost sensing nodes n11 to n51, and a line connecting the rightmost sensing nodes n16 to n56. In the related art touch-sensitive panel, the touch electrode forming area TA is extended so that the sensing nodes n11 to n16, n51 to n56, n11 to n51, and n16 to n56 lie outside the active area AA.

The routing wire forming area RA is disposed outside the touch electrode forming area TA where the first and second touch electrode lines TS1 to TS5 and RS1 to RS6 are formed, and comprises a plurality of first routing wires TW1 to TW5 connected to the plurality of first touch electrode lines TS1 to TS5, respectively, and a plurality of second routing wires RW1 to RW6 connected to the plurality of second touch electrode lines RS1 to RS6, respectively.

The pad forming area PA comprises a plurality of first routing pads TP1 to TP5 connected to the plurality of first routing wires TW1 to TW5, respectively, and a plurality of second routing pads RP1 to RP6 connected to the plurality of second routing wire RW1 to RW6, respectively.

The above-mentioned electrostatic capacitive touch-sensitive panel is a device which detects touch positions by detecting changes in electrostatic capacitances at the sensing nodes n11 to n56 closest to the touch positions when the user touches (approaches; hereinafter, simply referred to as 'touch') the touch-sensitive panel with a fingers or a conductive metal such as a stylus pen. As the sensing nodes n11 to n56 are used as a reference to trace touch (or approach) positions, the touch electrode forming area TA is larger in size than the active area AA so that the user can touch any point in the entire active area AA corresponding to the display area of the display device.

For this reason, the related art touch-sensitive panel has a wide bezel area (outside the active area AA) with no screen display, thus failing to cope with the recent demand for a narrow bezel.

With the increasing demand for a touch-sensitive panel with a narrow bezel, attempts are being made to make the active area AA and the touch electrode forming area TA similar in size.

Figure 3:
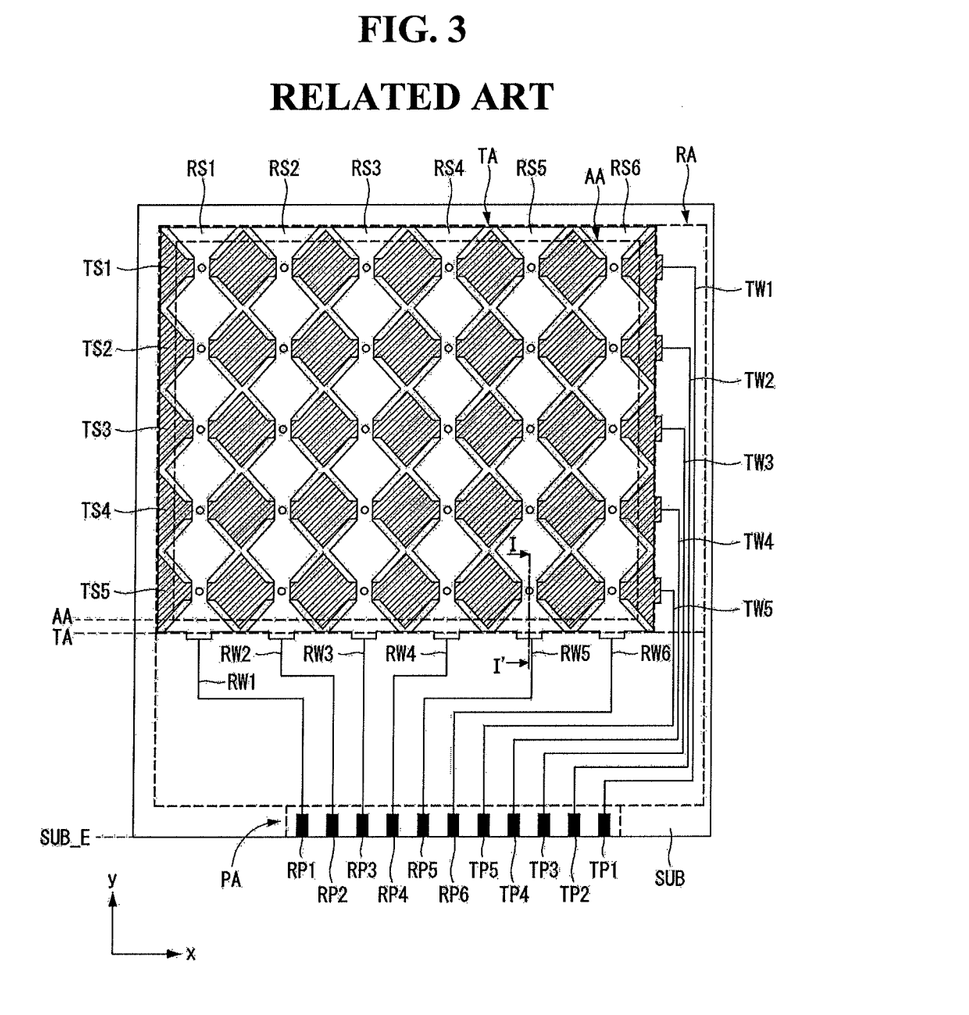
FIG. 3 is a plan view of a related art electrostatic capacitive touch-sensitive panel for a display device.
Figure 4:
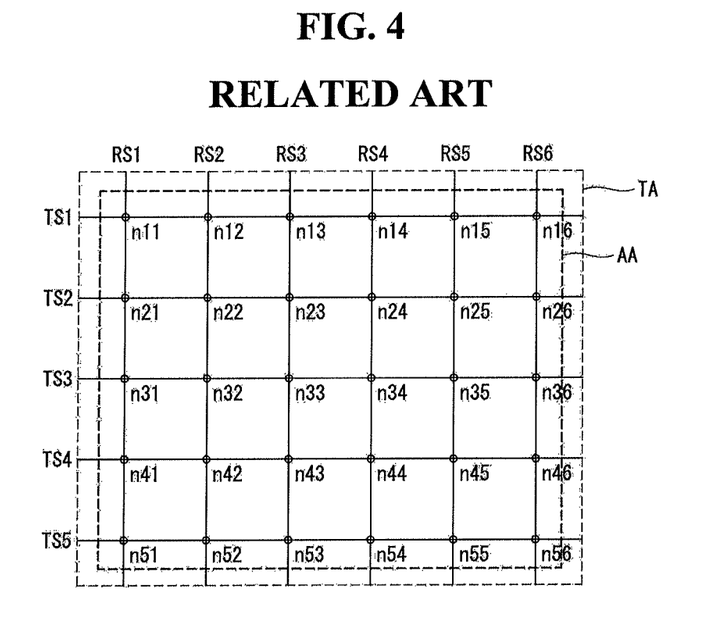
FIG. 4 is a view conceptually showing sensing nodes formed on the touch-sensitive panel of FIG. 3.

Hereinafter, an electrostatic capacitive touch-sensitive panel complying with the recent demand for a narrow bezel will be described with reference to FIGS. 3 and 4. FIG. 3 is a plan view of a related art electrostatic capacitive touch-sensitive panel for a display device. FIG. 4 is a view conceptually showing sensing nodes formed on the touch-sensitive panel of FIG. 3.

The touch-sensitive panel with a narrow bezel of FIG. 3 is identical to the touch-sensitive panel of FIGS. 1 and 2 except that the boundary of the active area AA lies outside the area formed by connecting the uppermost sensing nodes n11 to n16, the lowermost sensing nodes n51 to n56, the leftmost sensing nodes n11 to n51, and the rightmost sensing nodes n16 to n56, so further explanation will be omitted to avoid redundancy.

However, the touch-sensitive panel with a narrow bezel of FIG. 3 requires a substantial reduction of the distance between the edge of the active area and the edge of the touch electrode forming area TA, and therefore the time constant increases due to the increase in distance between the touch electrodes and the routing wires. Moreover, the extension portions of the touch electrode lines TS1 to TS5 and RS1 to RS6 outside the active area AA are reduced, resulting in low touch accuracy on the edge regions.

Accordingly, the touch-sensitive panel with a narrow bezel also brings up the need to consider measures to improve the touch accuracy on the edge regions.

SUMMARY

An electrostatic capacitive touch-sensitive panel comprises: an active area; a touch electrode forming area surrounding the active area; a routing wire forming area disposed outside the touch electrode forming area and having a plurality of electrode pattern extension regions; a plurality of first touch electrode lines disposed in the active area, and arranged in parallel in a first direction, with both ends extending to the plurality of electrode pattern extension regions; a plurality of second touch electrode lines disposed in the active area, and arranged in a second direction crossing the first direction so as to cross the first touch electrode lines without contact; a plurality of first routing wires arranged in the routing wire forming area, and connected to the plurality of first touch electrode lines, respectively; and a plurality of second routing wires arranged in the routing wire forming area, and connected to the plurality of second touch electrode lines, respectively, each of the second touch electrode lines comprising a plurality of second touch electrode patterns and a plurality of second connecting portions connecting neighboring second touch electrode patterns, and the second touch electrode pattern on the outermost part of the active area having an asymmetrical portion.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. In the drawings:

FIG. 7B is a cross-sectional view taken along the line I-I' of FIG. 7a;

DETAILED DESCRIPTION

Hereinafter, exemplary embodiments of this disclosure will be described in detail with reference to the accompanying drawings, wherein same reference numerals may be used to denote the same or substantially the same elements throughout the specification and the drawings.

Figure 5:
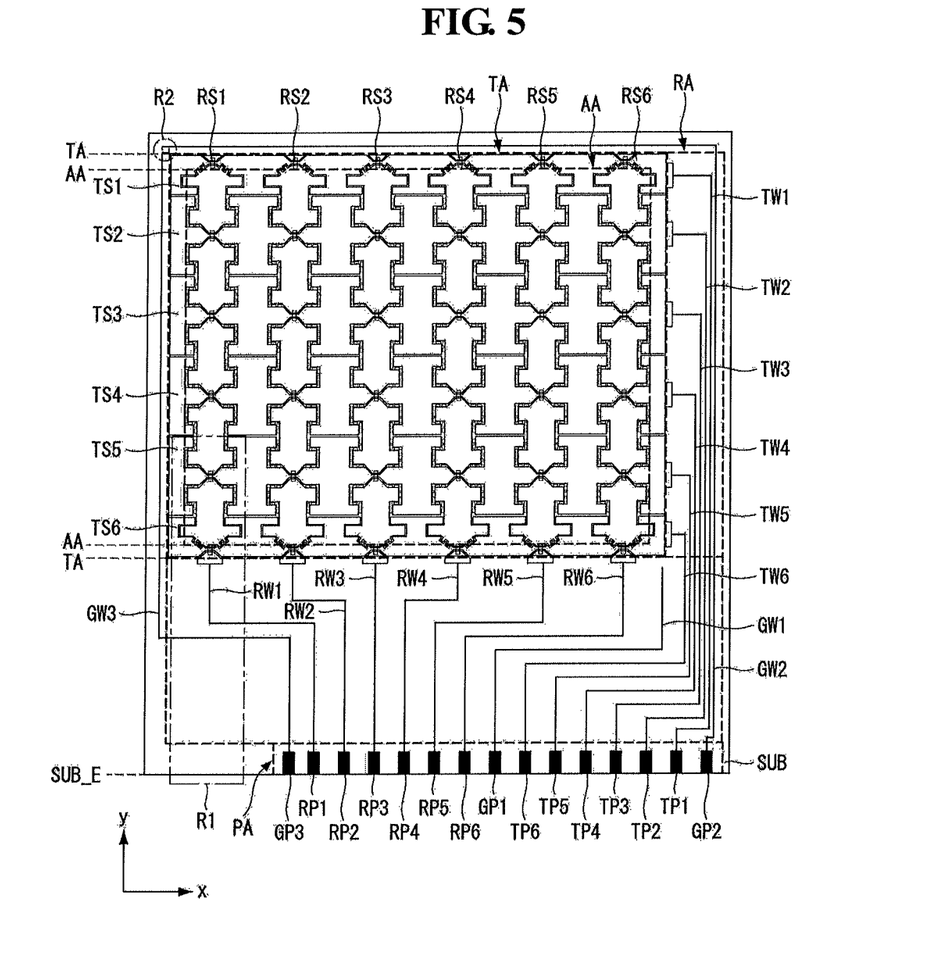
FIG. 5 is a plan view of an electrostatic capacitive touch-sensitive panel according to an exemplary embodiment of the present invention.
Figure 6:
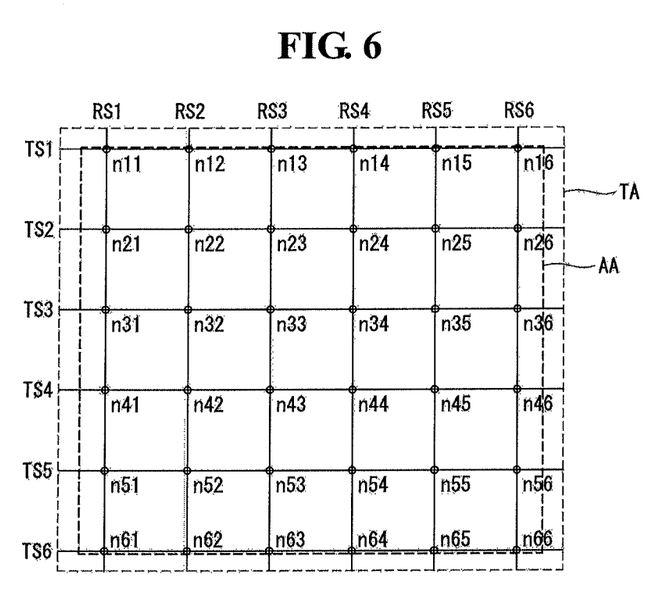
FIG. 6 is a view conceptually showing sensing nodes formed on the touch-sensitive panel of FIG. 5.

An electrostatic capacitive touch-sensitive panel according to an exemplary embodiment of the present invention will be described with reference to FIGS. 5 and 6. FIG. 5 is a plan view of an electrostatic capacitive touch-sensitive panel according to an exemplary embodiment of the present invention. FIG. 6 is a view conceptually showing sensing nodes formed on the touch-sensitive panel of FIG. 5.

Referring to FIGS. 5 and 6, the electrostatic capacitive touch-sensitive panel according to the exemplary embodiment of the present invention comprises a touch electrode forming area TA where touch electrode patterns are formed, an active area AA corresponding to a data display area of a display device, a routing wire forming area RA where routing wires are formed to send and receive signals to and from the touch electrode forming area AA, and a pad forming area PA where routing pads are formed to connect the routing wires to signal lines of a touch driving circuit.

The touch electrode forming area TA comprises an active area AA corresponding to a data display area of a display device (not shown) and where touch electrode patterns are formed.

The touch electrode forming area TA comprises a plurality of first touch electrode lines or serials TS1 to TS6 arranged on a transparent substrate SUB in parallel in a first direction (e.g. x-axis direction), and a plurality of second touch electrode lines or serials RS1 to RS6 arranged in parallel in a second direction (e.g. y-axis direction) so as to cross over the first touch electrode lines TS1 to TS6 with an insulation layer INS (see the cross-sectional view of FIG. 7B) or insulation patterns INS (see FIG. 8B) interposed between them. Points formed by the intersections of the first and second touch electrode lines TS1 to TS6 and RS1 to RS6 are referred to as sensing nodes n11 to n66. Due to the insulation layer or insulation patterns (see FIGS. 7b and 8b), the first touch electrode lines TS1 to TS6 and the second touch electrode lines RS1 to RS6 are not in contact with each other at the sensing nodes n11 to n56. As such, when a touch driving voltage is applied to either the first touch electrode lines TS1 to TS6 or the second touch electrode lines RS1 to RS6, mutual capacitance occurs between both of the first touch electrode lines TS1 to TS6 and the second touch electrode lines RS1 to RS6. Details of the first and second touch electrode lines TS1 to TS6 and RS1 to RS6 formed in the touch electrode forming area TA will be described later.

As shown in FIG. 6, the active area AA is a part of the active area AA defined by the intersections of a first virtual line connecting the uppermost sensing nodes n11, n12, n13, n14, n15, and n16, a second virtual line connecting the lowermost sensing nodes n61, n62, n63, n64, n65, and n66, a line located outside a third virtual line connecting the leftmost sensing nodes n11, n21, n31, n41, n51, and n61, and a line located outside a fourth virtual line connecting the rightmost sensing nodes n16, n26, n36, n46, n56, and n66.

The active area TA comprises a plurality of first touch electrode lines TS1 to TS6 (touch driving electrode lines or touch sensing electrode lines) arranged on the substrate SUB in parallel in the first direction (e.g. x-axis direction), and a plurality of second touch electrode lines RS1 to RS6 (touch driving electrode lines or touch sensing electrode lines) arranged in parallel in the second direction (e.g. y-axis direction) so as to cross over the first touch electrode lines TS1 to TS6 with an insulation layer or insulation patterns INS interposed between them. The active area AA further comprises sensing nodes n11 to n66, which are points formed by the intersections of the first and second touch electrode lines TS1 to TS6 and RS1 to RS6. Of the sensing nodes n11 to n66, the uppermost sensing nodes n11 to n16 and the lowermost sensing nodes n61 to n66 may be formed in the touch electrode forming area TA outside the active area AA.

The routing wire forming area RA is disposed outside the touch electrode forming area RA where the first and second touch electrode lines TS1 to TS6 and RS1 to RS6 are formed, and comprises a plurality of first routing wires TW1 to TW6 connected to the plurality of first touch electrode lines TS1 to TS6, respectively, and a plurality of second routing wires RW1 to RW6 connected to the plurality of second touch electrode lines RS1 to RS6, respectively.

Figure 9:
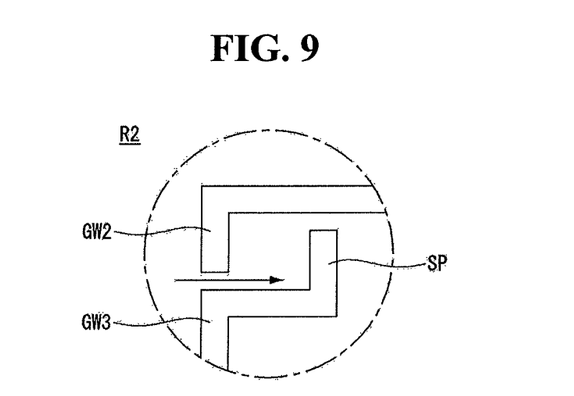
FIG. 9 is an enlarged view showing the region R2 of FIG. 5.

The routing wire forming area RA comprises a first ground line GW1 disposed between the first and second routing wires TW6 and RW6 adjacent to each other and preventing mutual electric interference and second and third ground lines GW2 and GW3 disposed outside the touch electrode forming area TA and protecting the touch-sensitive panel from static electricity coming in from the outside. The second and third ground lines GW2 and GW3 are formed on the outermost part of the routing wire forming area RA so as to surround the first and second touch electrode lines and the first and second routing wires, and are separated from each other at the corners of the touch-sensitive panel, as can be seen from FIG. 9, which is an enlarged view of the region R2 of FIG. 5. More specifically, the second ground line GW2 and the third ground line GW3 are separated to avoid contact with each other, and the third ground line GW3 has a static electricity blocking pattern SP to prevent static electricity from coming in through the space separating the second and third ground lines GW2 and GW3, as indicated by the arrow.

The pad forming area. PA comprises a plurality of first routing pads TP1 to TP6 connected to the plurality of first routing wires TW1 to TW6, respectively, and a plurality of second routing pads RP1 to RP6 connected to the plurality of second routing wire RW1 to RW6, respectively. The pad forming area PA further comprises a first ground pad GP1 connected to the first ground line GW1, a second ground pad GP2 connected to the second ground line GW2, and a third ground pad GP3 connected to the third ground line GW3.

Figure 7A:
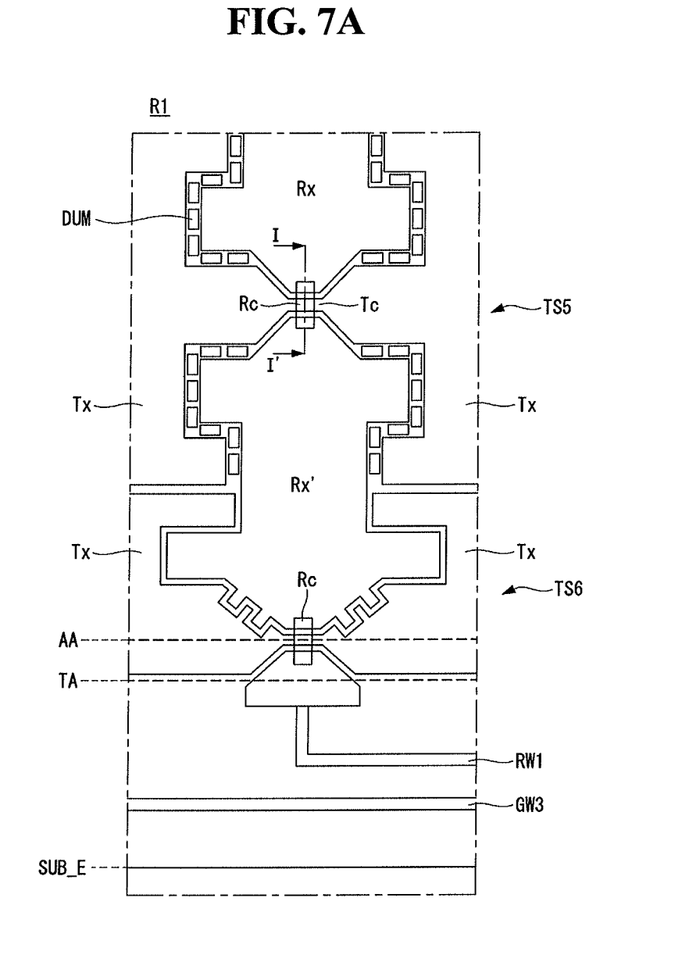
FIG. 7A is an enlarged plan view showing the region R1 of the touch-sensitive panel of FIG. 5 according to a first exemplary embodiment of the present invention.
Figure 7B:
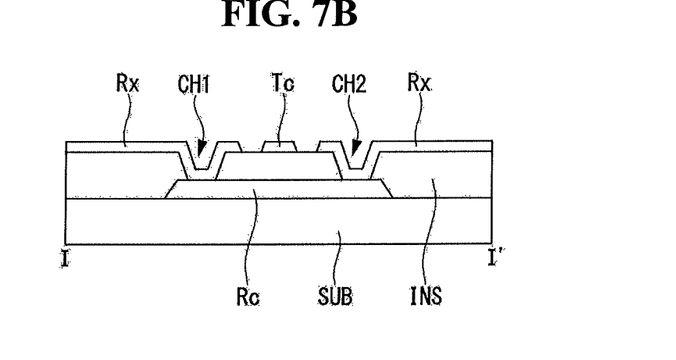
Figure 8A:
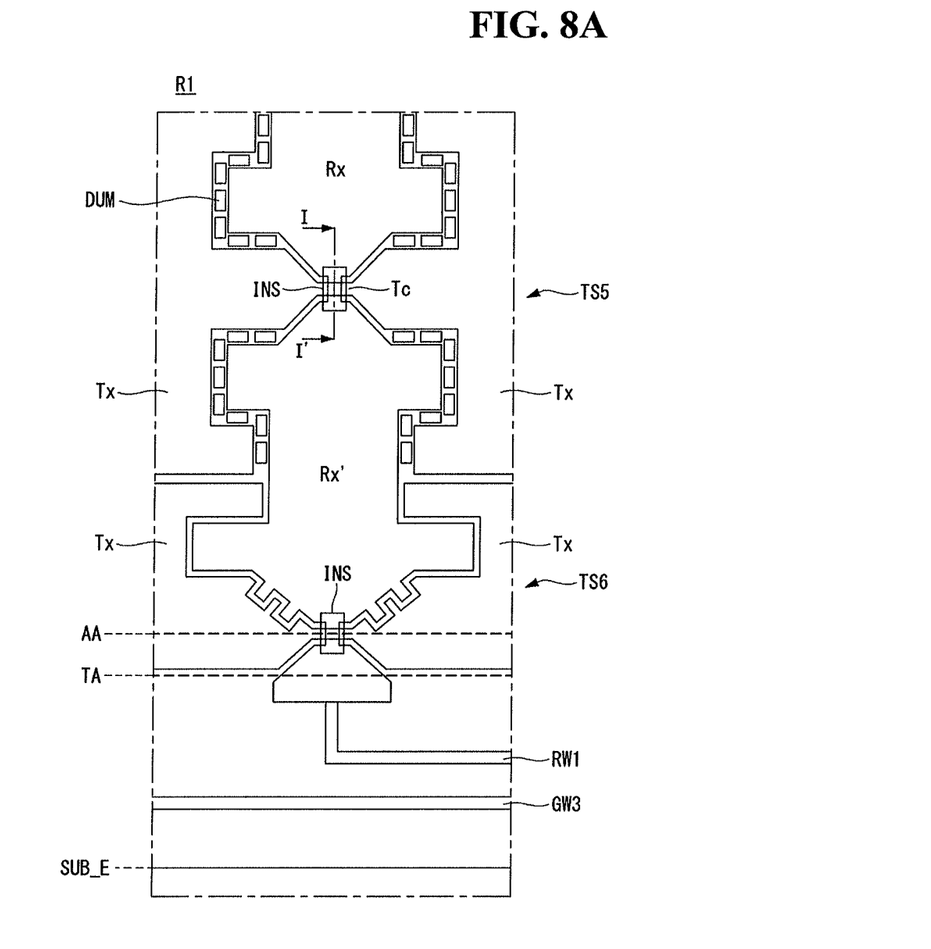
FIG. 8A is an enlarged plan view showing the region R1 of the touch-sensitive panel of FIG. 5 according to a second exemplary embodiment of the present invention.
Figure 8B:
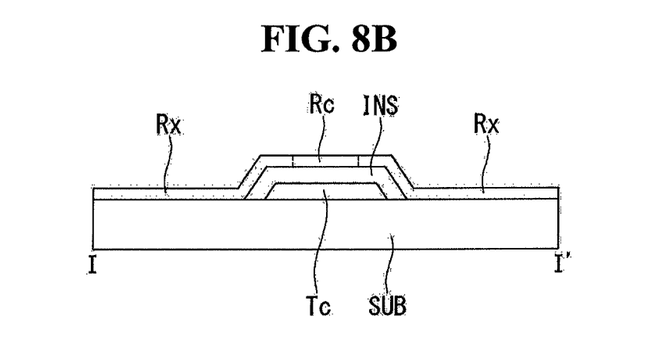
FIG. 8B is a cross-sectional view taken along the line I-I' of FIG. 8A.

Next, the first and second touch electrode lines TS1 to TS6 and RS1 to RS6 will be described in more detail with reference to FIGS. 7A to 8B. FIG. 7A is an enlarged plan view showing the region R1 of the touch-sensitive panel of FIG. 5 according to a first exemplary embodiment of the present invention. FIG. 7B is a cross-sectional view taken along the line I-I' of FIG. 7A. FIG. 8A is an enlarged plan view showing the region R1 of the touch-sensitive panel of FIG. 5 according to a second exemplary embodiment of the present invention. FIG. 8B is a cross-sectional view taken along the line I-I' of FIG. 8A.

First of all, referring to FIGS. 5, 7A, and 7B, each of the first touch electrode lines TS1 to TS6 comprises a plurality of first touch electrode patterns Tx having a predetermined shape and a plurality of first connecting portions Tc connecting first touch electrode patterns Tx neighboring each other in the first direction (x-axis direction in this exemplary embodiment). The first connecting portions Tc are smaller in size than the first touch electrode patterns Tx, and are integral with the first touch electrode patterns Tx.

Each of the second touch electrode lines RS1 to RS6 comprises a plurality of second touch electrode patterns Rx having a predetermined shape and a plurality of second connecting portions Rc connecting second touch electrode patterns Rx neighboring each other in the second direction (y-axis direction in this exemplary embodiment) crossing the first direction. The second touch electrode patterns Rx are separated from each other, and spaced apart from the first touch electrode patterns Tx by a predetermined gap to avoid overlap. Dummy patterns DUM may be formed between the first touch electrode patterns Tx and the second touch electrode patterns Rx. The second connecting portions Rc cross over the first connecting portions Tc.

In this exemplary embodiment (first exemplary embodiment), the second touch electrode pattern Rx' (hereinafter, 'outermost second touch electrode pattern') on the outermost part of the active area AA, i.e., closest to the boundary of the active area AA, has an asymmetrical portion with a different size and shape on the side closer to the boundary of the active area AA, as shown in FIG. 7a. The differently sized and shaped, asymmetrical portion of the outermost second touch electrode pattern has a zigzag portion. The first touch electrode pattern Tx corresponding to the zigzag portion of the outermost second touch electrode pattern Rx' also has the corresponding zigzag portion. No dummy patterns are formed in the space between the zigzag portion of the first touch electrode pattern Tx and the zigzag portion of the outermost second touch electrode pattern Rx' facing each other.

According to the first exemplary embodiment of the present invention, sensing nodes where signal strength can be maximized may be formed on the boundary of the active area AA. This maximizes the signal strength on the edge regions, contributing to improving the touch accuracy on the edge regions of a touch-sensitive panel with a narrow bezel.

Moreover, forming a zigzag portion along the asymmetric portion of the outermost second touch electrode pattern Rx' can increase the electrostatic capacitance forming channel, thus minimizing the difference in capacitance with an adjacent channel using the asymmetrical shape of the touch electrodes.

Next, the structure of the touch-sensitive panel according to the first exemplary embodiment of the present invention will be described in more detail with reference to FIGS. 7A and 7B.

As shown in FIGS. 5, 7A, and 7B, a plurality of second connecting portions Rc are formed on a substrate SUB along the second direction at regular intervals, and an insulation layer INS is formed over the second connecting portions RC to cover them. The insulation layer INS comprises first and second contact holes CH1 and CH2 exposing both sides of the second connecting portions Rc. A plurality of first touch electrode lines TS1 to TS6 arranged in the first direction and a plurality of second touch electrode patterns Rx arranged in the second direction crossing the first direction and filling the first and second contact holes CH1 and CH2 are formed on the insulation layer INS with the first and second contact holes CH1 and CH2. Neighboring second electrode patterns Rx are filled in the first and second contact holes CH1 and CH2, respectively, to form second touch electrode lines RS1 to RS6, which are connected together by the second connecting portions Rc and arranged in the second direction. The first touch electrode lines TS1 to TS6 and the second touch electrode lines RS1 to RS6 are formed in such a manner that the first connecting portions Tc and the second connecting portions Rc cross over each other with the insulation layer INS interposed between them. With this configuration, the first connecting portions Tc and the second connecting portions Rc overlap each other. The sensing nodes n11 to n66 shown in FIG. 6 are formed by the overlapping of the first connecting portions Tc and the second connecting portions Rc.

Next, referring to FIGS. 5, 8A, and 8B, each of the first touch electrode lines TS1 to TS6 comprises a plurality of first touch electrode patterns Tx having a predetermined shape and a plurality of first connecting portions Tc connecting first touch electrode patterns Tx neighboring each other in the first direction (x-axis direction in this exemplary embodiment). The first connecting portions Tc are smaller in size than the first touch electrode patterns Tx, and are integral with the first touch electrode patterns Tx.

Each of the second touch electrode lines RS1 to RS6 comprises a plurality of second touch electrode patterns Rx having a predetermined shape and a plurality of first connecting portions Rc connecting first touch electrode patterns Tx neighboring each other in the second direction (y-axis direction in this exemplary embodiment) crossing the first direction. The second touch electrode patterns Rx are connected together, and spaced apart from the first touch electrode patterns Tx by a predetermined gap to avoid overlap. Dummy patterns DUM may be formed between the first touch electrode patterns Tx and the second touch electrode patterns Rx. The second connecting portions Rc cross over the first connecting portions Tc, and insulation patterns INS are formed at the crossings of the first connecting portions Tc and the second connecting portions Rc to avoid contact between them.

In this exemplary embodiment (second exemplary embodiment), like the first exemplary embodiment, the second touch electrode pattern Rx' (hereinafter, 'outermost second touch electrode pattern') on the outermost part of the active area AA, i.e., closest to the boundary of the active area AA, has an asymmetrical portion with a different size and shape on the side closer to the boundary of the active area AA, as shown in FIG. 8a. The differently sized and shaped, asymmetrical portion of the outermost second touch electrode pattern Rx' has a zigzag portion. The first touch electrode pattern Tx corresponding to the zigzag portion of the outermost second touch electrode pattern Rx' also has the corresponding zigzag portion. No dummy patterns are formed in the space between the zigzag portion of the first touch electrode pattern Tx and the zigzag portion of the outermost second touch electrode pattern Rx' facing each other.

According to the second exemplary embodiment of the present invention, sensing nodes where signal strength can be maximized may be formed on the boundary of the active area AA. This maximizes the signal strength on the edge regions, contributing to improving the touch accuracy on the edge regions of a touch-sensitive panel with a narrow bezel. Moreover, forming a zigzag portion along the asymmetric portion of the outermost second touch electrode pattern Rx' can increase the electrostatic capacitance forming channel, thus minimizing the difference in capacitance with an adjacent channel using the asymmetrical shape of the touch electrodes.

Next, the structure of the touch-sensitive panel according to the second exemplary embodiment of the present invention will be described in more detail with reference to FIGS. 8a and 8b.

As shown in FIGS. 5, 8A, and 8B, a plurality of first touch electrode lines TS1 to TS6 are formed in parallel in the first direction on the substrate SUB. Each of the first touch electrode lines TS1 to TS6 comprises a plurality of first touch electrode patterns Tx and a plurality of first connecting patterns Tc connecting neighboring first touch electrode patterns Tx. The first touch electrode patterns Tx and the first connecting patterns Tc are integral with each other. Island-shaped insulation patterns INS are formed on the first connecting patterns Tc, respectively. A plurality of second touch electrode lines RS1 to RS6 are formed in parallel in the second direction on the substrate SUB where the first touch electrode lines TS1 to TS6 and the insulation patterns INS are formed. The first touch electrode lines TS1 to TS6 and the second touch electrode lines RS1 to RS6 are formed in such a manner that the first connecting portions Tc and the second connecting portions Rc cross over each other with the insulation patterns INS interposed between them. With this configuration, the first connecting portions Tc and the second connecting portions Rc overlap each other. The sensing nodes n11 to n66 shown in FIG. 6 are formed by the overlapping of the first connecting portions Tc and the second connecting portions Rc.

According to the electrostatic capacitive touch-sensitive panels according to the first and second exemplary embodiments of the present invention, the signal strength on the edge regions can be maximized, contributing to improving the touch accuracy on the edge regions of a touch-sensitive panel with a narrow bezel. Moreover, forming a zigzag portion along the asymmetric portion of the outermost second touch electrode pattern Rx' can increase the electrostatic capacitance forming channel, thus minimizing the difference in capacitance with an adjacent channel using the asymmetrical shape of the touch electrodes.

Figure 10:
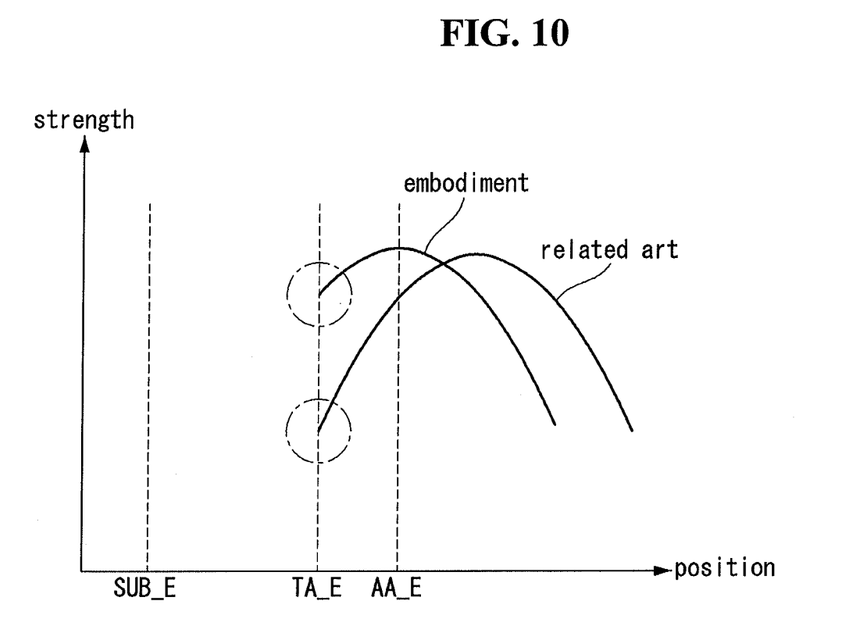
FIG. 10 is a graph showing the signal strength versus touch position in the touch-sensitive panel according to the present invention and the related art touch-sensitive panel.

FIG. 10 is a graph showing the signal strength versus touch position in the touch-sensitive panel according to the present invention and the related art touch-sensitive panel. In FIG. 10, unexplained reference numerals SUB_E denotes the edge of the substrate SUB, TA_E denotes the edge of the touch electrode forming area, and AA_E denotes the edge of the active area AA. As can be seen in the graph of FIG. 10, the signal strength on the portions between the active area AA and the touch electrode forming area TA, that is, the edge regions, is much higher in the touch-sensitive panel of the present invention than in the related art touch-sensitive panel. Accordingly, the touch accuracy on the edge regions can be improved.

A touch-sensitive panel according to an exemplary embodiment of the present invention may be applicable to display devices including a liquid crystal display (LCD), a field emission display (FED), a plasma display panel (PDP), an electroluminescence device EL, and an electrophoretic display.

From the above description, it will be apparent to those skilled in the art that various changes and modifications can be made without departing from the technical spirit of the present invention.

For instance, the first touch electrode lines may be touch driving electrode lines or touch sensing electrode lines, and the second touch electrode lines may be touch sensing electrode lines or touch driving electrode lines.

In addition, the number of first touch electrode lines, the number of second touch electrode lines, the number of first routing wires, the number of second routing wires, the number of first routing pads, and the number of second routing pads that are given in the exemplary embodiments of the present invention are only illustrative, and these number can be higher or lower as the case may be.

Although the exemplary embodiments of the present invention have been shown and described that the first routing wires are formed only on one side of the active area AA, it should be understood that, for a large-sized touch-sensitive panel, the first routing wires may be formed on both sides of the active area.

Moreover, although the exemplary embodiments of the present invention have been described that all of the first routing wires are formed in electrode pattern extension regions where extension portions of the electrode patterns are disposed, the present invention is not limited to this example and some of the first routing wires may be formed outside the extended electrode pattern area as the case may be.

Accordingly, the scope of the present invention should not be limited by the exemplary embodiments, but should be defined by the appended claims.

What is claimed is:

1. An electrostatic capacitive touch-sensitive panel comprising:
    an active area;
    a touch electrode forming area surrounding the active area;
    a routing wire forming area disposed outside the touch electrode forming area;
    a plurality of first touch electrode lines disposed in the active area, and arranged in parallel in a first direction;
    a plurality of second touch electrode lines disposed in the active area, and arranged in a second direction crossing the first direction so as to cross the first touch electrode lines without contact, each of the second touch electrode lines including:
        a plurality of second touch electrode patterns, each of the second touch electrode patterns including a central portion in a central region thereof, a first portion connected to an end of the central portion, and a second portion connected to an opposite end of the central portion, the first and second portions being spaced apart from one another in the second direction by the central portion, the first portion and the second portion of each of outermost second touch electrode patterns that are positioned on outermost regions of the active area along the second direction having respective lengths along the first direction that are different from each other, and the first portion and the second portion of each of the second touch electrode patterns except those positioned on the outermost regions having respective lengths along the first direction that are substantially the same; and
        a plurality of second connecting portions connecting neighboring second touch electrode patterns;
    a plurality of first routing wires arranged in the routing wire forming area, and connected to the plurality of first touch electrode lines, respectively; and
    a plurality of second routing wires arranged in the routing wire forming area, and connected to the plurality of second touch electrode lines, respectively.

2. The electrostatic capacitive touch-sensitive panel of claim 1, wherein at least one of the first portion and the second portion of the outermost second touch electrode patterns includes a zigzag portion.

3. The electrostatic capacitive touch-sensitive panel of claim 1, wherein each of the first touch electrode lines includes a plurality of first touch electrode patterns and a plurality of first connecting portions connecting neighboring first touch electrode patterns, and
    the second touch electrode patterns are spaced apart from the first touch electrode patterns by a predetermined gap to avoid overlap, and at least one dummy pattern is positioned in the gap.

4. The electrostatic capacitive touch-sensitive panel of claim 3, wherein the first connecting portions and the second connecting portions have overlap regions, and the overlap regions maintain a non-contact structure by an insulation layer or insulation patterns.

5. The electrostatic capacitive touch-sensitive panel of claim 4, wherein the overlap regions on the outermost regions along the second direction are on the boundary of the active area or outside the active area.

6. The electrostatic capacitive touch-sensitive panel of claim 1, further comprising a first ground line disposed between neighboring first and second routing wires and preventing mutual electric interference.

7. The electrostatic capacitive touch-sensitive panel of claim 6, further comprising second and third ground lines that are on an outermost part of the routing wire forming area so as to surround the first and second touch electrode lines and the first and second routing wires and are separated from each other at corners of the touch-sensitive panel.

8. The electrostatic capacitive touch-sensitive panel of claim 7, wherein the second and third ground lines are separated, and any one of the second and third ground lines has a static electricity blocking pattern to prevent static electricity from coming in through the space separating the second and third ground lines.

9. The electrostatic capacitive touch-sensitive panel of claim 1, wherein the second portion of each of the outermost second touch electrode patterns is disposed between the first portion and the outermost regions of the active area, and the length along the first direction of the first portion of each of the outermost second touch electrode patterns is less than that the length along the first direction of the second portion of each of the outermost second touch electrode patterns.

10. The electrostatic capacitive touch-sensitive panel of claim 1, wherein each of the outermost second touch electrode patterns includes a plurality of zigzag portions disposed between the second portion and the outermost regions of the active area.

11. The electrostatic capacitive touch-sensitive panel of claim 10, wherein each of the outermost second touch electrode patterns includes a plurality of first zigzag portions outside the second portion of the outermost second touch electrode pattern.

12. The electrostatic capacitive touch-sensitive panel of claim 11, wherein each of the first touch electrode lines includes a plurality of first touch electrode patterns and a plurality of first connecting portions connecting neighboring first touch electrode patterns, and a first touch electrode pattern corresponding to a respective one of the outermost second touch electrode patterns includes a plurality of second zigzag portions corresponding to the plurality of first zigzag portions.

* * * * *